(12) United States Patent
Komatsu et al.

(10) Patent No.: US 8,483,024 B2
(45) Date of Patent: Jul. 9, 2013

(54) DISC DISCRIMINATION APPARATUS AND METHOD

(75) Inventors: Takahiro Komatsu, Kanagawa-ken (JP); Seiichiro Fujii, Tokyo (JP); Masao Ubukata, Kanagawa-ken (JP)

(73) Assignee: J & K Car Electronics Corporation, Tokyo (JP)

( * ) Notice: Subject to any disclaimer, the term of this patent is extended or adjusted under 35 U.S.C. 154(b) by 227 days.

(21) Appl. No.: 12/929,867

(22) Filed: Feb. 22, 2011

(65) Prior Publication Data

US 2011/0211430 A1  Sep. 1, 2011

(30) Foreign Application Priority Data

Feb. 26, 2010  (JP) .................................. 2010-041355

(51) Int. Cl.
*G11B 20/18*  (2006.01)
*G11B 7/00*  (2006.01)
(52) U.S. Cl.
USPC ................... 369/44.29; 369/44.27; 369/53.2; 369/53.23

(58) Field of Classification Search
USPC ............ 369/44.27, 53.2, 30.01, 44.29, 53.23
See application file for complete search history.

(56) References Cited

U.S. PATENT DOCUMENTS

| 2005/0030867 A1* | 2/2005 | Choi et al. ................ 369/53.23 |
| 2005/0052978 A1* | 3/2005 | Yoon et al. ................ 369/53.23 |
| 2005/0068872 A1* | 3/2005 | Kim et al. .................... 369/53.2 |
| 2007/0211588 A1* | 9/2007 | Miyazaki et al. .......... 369/44.29 |

FOREIGN PATENT DOCUMENTS

JP  2006-228401  8/2006

* cited by examiner

*Primary Examiner* — Wayne Young
*Assistant Examiner* — Dionne Pendleton
(74) *Attorney, Agent, or Firm* — Louis Woo

(57) ABSTRACT

Detection is made as to at least one of a ratio between a tracking error and a focus error, and a duty cycle of an off-track signal with respect to an optical disc. A decision is made as to whether or not the optical disc is playable on the basis of the detected at least one of the ratio and the duty cycle. The ratio is a ratio of the focus error to the tracking error or a ratio of the tracking error to the focus error.

8 Claims, 6 Drawing Sheets

DISC DISCRIMINATION APPARATUS AND METHOD

BACKGROUND OF THE INVENTION

1. Field of the Invention

This invention relates to a disc discrimination apparatus which may be provided in a recording-disc player such as an on-board CD (Compact Disc) player. In addition, this invention relates to a disc discrimination method.

2. Description of the Related Art

A conventional apparatus for reproducing recorded information from a recording disc such as a CD operates as follows. When a recording disc is inserted into an apparatus body, the conventional apparatus decides whether or not the inserted disc can be played by the apparatus, that is, whether or not recorded information can be reproduced from the inserted disc by the apparatus. In the case where the apparatus decides that the inserted disc can be played, the apparatus starts a process of reproducing recorded information from the disc. Otherwise, the apparatus does not start the process.

Japanese patent application publication number 2006-228401 discloses a disc discrimination process which includes a step of setting a focus gain, a step of provisionally setting a tracking gain, and a step of finally setting the tracking gain. In the disc discrimination process, a focus error amplitude related to an optical disc in question is repetitively measured to obtain a set of measured values. Then, the average of the measured values is calculated. In the disc discrimination process, a focus gain is set in response to the average focus error amplitude, and a decision is made as to whether the reflectivity of the optical disc in question is high or low on the basis of the set focus gain. Then, the optical disc with a high reflectivity is concluded to be a CD-DA. On the other hand, the optical disc with a low reflectivity is concluded to be a CD-RW.

In the disc discrimination process of Japanese application 2006-228401, a focus error amplitude is repetitively measured. The disc discrimination process includes a step of setting a focus gain, a step of provisionally setting a tracking gain, and a step of finally setting the tracking gain. Accordingly, it tends to take a long time to implement the disc discrimination process.

SUMMARY OF THE INVENTION

It is a first object of this invention to provide an apparatus for quickly implementing disc discrimination.

It is a second object of this invention to provide a method of quickly implementing disc discrimination.

A first aspect of this invention provides a disc discrimination apparatus comprising a detecting section configured to detect at least one of a ratio between a tracking error and a focus error, and a duty cycle of an off-track signal with respect to an optical disc; and a deciding section configured to decide whether or not the optical disc is playable on the basis of said at least one of the ratio and the duty cycle detected by the detecting section.

A second aspect of this invention is based on the first aspect thereof, and provides a disc discrimination apparatus wherein the ratio is a ratio of the focus error to the tracking error, and the deciding section determines whether or not the ratio is smaller than a predetermined threshold value, and decides that the optical disc is playable when it is determined that the ratio is smaller than the predetermined threshold value.

A third aspect of this invention is based on the first aspect thereof, and provides a disc discrimination apparatus wherein the ratio is a ratio of the tracking error to the focus error, and the deciding section determines whether or not the ratio is greater than a predetermined threshold value, and decides that the optical disc is playable when it is determined that the ratio is greater than the predetermined threshold value.

A fourth aspect of this invention is based on the first aspect thereof, and provides a disc discrimination apparatus further comprising a focus servo, a tracking servo, and means configured to adjust a tracking servo gain while holding the focus servo in its on state and holding the tracking servo in its off state, and wherein the tracking error used for the ratio and the duty cycle are those occurring while the tracking servo gain is adjusted by said means, and the deciding section decides whether or not the optical disc is playable after said adjusting the tracking servo gain has been completed.

A fifth aspect of this invention is based on the fourth aspect thereof, and provides a disc discrimination apparatus further comprising a tracking-error-balance adjusting section configured to decide whether or not said adjusting the tracking servo gain has been completed in a given term, to suspend said adjusting the tracking servo gain in cases where said adjusting the tracking servo gain has not been completed in the given term, to change a tracking error balance when said adjusting the tracking servo gain is suspended, and to restart said adjusting the tracking servo gain after the tracking error balance is changed.

A sixth aspect of this invention is based on the fifth aspect thereof, and provides a disc discrimination apparatus wherein the tracking-error-balance adjusting section changes the tracking error balance to a first preset value when said adjusting the tracking servo gain is suspended, restarts said adjusting the tracking servo gain after the tracking error balance is changed to the first preset value, decides whether or not said restarted adjusting the tracking servo gain has been completed in the given term, suspends said restarted adjusting the tracking servo gain in cases where said restarted adjusting the tracking servo gain has not been completed in the given term, and changes the tracking error balance to a second preset value when said restarted adjusting the tracking servo gain is suspended, and restarts said adjusting the tracking servo gain after the tracking error balance is changed to the second preset value, and wherein the first and second preset values are in opposite sides of a reference value respectively.

A seventh aspect of this invention provides a disc discrimination method comprising the steps of detecting at least one of a ratio between a tracking error and a focus error, and a duty cycle of an off-track signal with respect to an optical disc; and deciding whether or not the optical disc is playable on the basis of said detected at least one of the ratio and the duty cycle.

An eighth aspect of this invention is based on the seventh aspect thereof, and provides a disc discrimination method wherein the ratio is a ratio of the focus error to the tracking error, and the deciding step comprises determining whether or not the ratio is smaller than a predetermined threshold value, and deciding that the optical disc is playable when it is determined that the ratio is smaller than the predetermined threshold value.

A ninth aspect of this invention is based on the seventh aspect thereof, and provides a disc discrimination method wherein the ratio is a ratio of the tracking error to the focus error, and the deciding step comprises determining whether or not the ratio is greater than a predetermined threshold value, and deciding that the optical disc is playable when it is determined that the ratio is greater than the predetermined threshold value.

A tenth aspect of this invention is based on the seventh aspect thereof, and provides a disc discrimination apparatus further comprising the step of adjusting a tracking servo gain while holding a focus servo in its on state and holding a tracking servo in its off state, and wherein the tracking error used for the ratio and the duty cycle are those occurring while the tracking servo gain is adjusted, and the deciding step comprises deciding whether or not the optical disc is playable after said adjusting the tracking servo gain has been completed.

An eleventh aspect of this invention is based on the tenth aspect thereof, and provides a disc discrimination method further comprising the steps of deciding whether or not said adjusting the tracking servo gain has been completed in a given term, suspending said adjusting the tracking servo gain in cases where said adjusting the tracking servo gain has not been completed in the given term, changing a tracking error balance when said adjusting the tracking servo gain is suspended, and restarting said adjusting the tracking servo gain after the tracking error balance is changed.

A twelfth aspect of this invention is based on the eleventh aspect thereof, and provides a disc discrimination method wherein the tracking error balance is changed to a first preset value when said adjusting the tracking servo gain is suspended, and said adjusting the tracking servo gain is restarted after the tracking error balance is changed to the first preset value, and further comprising the steps of deciding whether or not said restarted adjusting the tracking servo gain has been completed in the given term, suspending said restarted adjusting the tracking servo gain in cases where said restarted adjusting the tracking servo gain has not been completed in the given term, changing the tracking error balance to a second preset value when said restarted adjusting the tracking servo gain is suspended, and restarting said adjusting the tracking servo gain after the tracking error balance is changed to the second preset value, and wherein the first and second preset values are in opposite sides of a reference value respectively.

This invention offers the following advantage. It is possible to quickly implement disc discrimination.

DETAILED DESCRIPTION OF THE INVENTION

Figure 1:
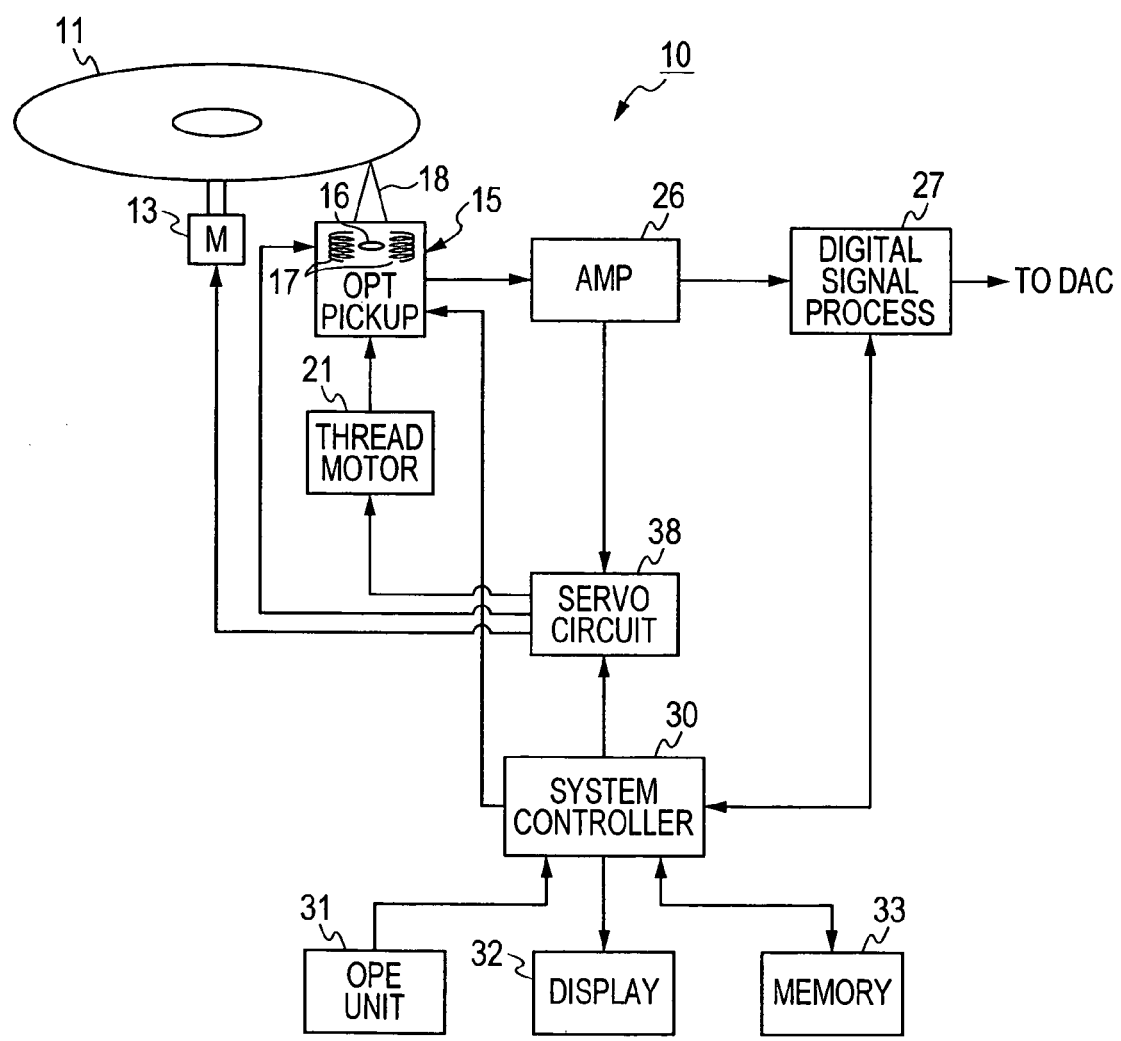
FIG. 1 is a diagram of an apparatus for reproducing recorded information from an optical disc according to a first embodiment of this invention.

FIG. 1 shows an apparatus 10 for reproducing recorded information from an optical disc according to a first embodiment of this invention. The apparatus 10 may include an optical-disc player such as a CD (Compact Disc) player. The optical-disc player 10 may be provided in an automotive vehicle. The optical-disc player 10 is divided into an optical-disc drive and other portions.

The optical-disc player 10 can drive or play an optical disc 11 such as a CD being one of a CD-DA, a CD-R, and a CD-RW. The CD-R is a standard-quality CD-R or a low-quality CD-R. The low-quality CD-R has a quality lower than a standard quality. A first example of the low-quality CD-R has a track pitch narrower than a standard value. A second example of the low-quality CD-R has optical characteristics causing a small tracking error amplitude or a great crosstalk.

When being chucked in the optical-disc player 10, the optical disc 11 is on a turntable (not shown) and is pressed thereto from above by a damper (not shown). A spindle motor 13 in the optical-disc player 10 rotates the turntable with the optical disc 11.

The optical-disc player 10 includes an optical pickup 15. A traverse device including a thread motor 21 moves the optical pickup 15 radially with respect to the optical disc 11. The optical pickup 15 includes an objective lens 16 and electromagnetic coils 17. The electromagnetic coils 17 serve as an actuator for moving the objective lens 16 in an axial direction and an actuator for moving the objective lens 16 in a track width direction with respect to the optical disc 11 in response to servo signals from a servo circuit 38. The optical pickup 15 includes a light source for emitting a laser beam. The emitted laser beam passes through the objective lens 16, being focused onto a target position on the data (information) recording side of the optical disc 11. The laser beam is reflected by the optical disc 11 before returning to the optical pickup 15. The return laser beam passes through the objective lens 16 and then reaches a photodetector in the optical pickup 15. The photodetector converts the return laser beam into electric signals referred to as photodetector signals. The optical pickup 15 outputs the photodetector signals to an amplifier 26.

The amplifier 26 includes circuits for generating an RF signal, a tracking error (TE) signal, and a focus error (FE) signal from the photodetector signals. The RF signal contains recorded information reproduced from the optical disc 11. The amplifier 26 feeds the RF signal to a digital signal processing circuit 27 in the optical-disc player 10. The digital signal processing circuit 27 subjects the RF signal to processes such as demodulation, expansion, and decoding to obtain a digital audio signal and prescribed information. The digital signal processing circuit 27 feeds the digital audio signal to a DAC (digital-to-analog converter). The DAC converts the digital audio signal into an analog audio signal. The analog audio signal is sent to a loudspeaker or loudspeakers, being changed into corresponding sounds.

The optical-disc player 10 includes a system controller 30. The system controller 30 receives user's commands from an operation unit 31 which can be actuated by a user. The system controller 30 receives the prescribed information from the digital signal processing circuit 27. The system controller 30 generates control signals and prescribed data for the optical pickup 15, the digital signal processing circuit 27, a display 32, and the servo circuit 38 in response to the received user's commands and the received prescribed information. The system controller 30 outputs the generated control signals and prescribed data to the optical pickup 15, the digital signal processing circuit 27, the display 32, and the servo circuit 38. The system controller 30 writes and reads data into and from a memory 33. The data read from the memory 33 is used in processes implemented by the system controller 30.

The memory 33 may include a RAM and a ROM. The RAM temporarily stores data used by the system controller 30. The ROM may store a control program (computer program) for the system controller 30.

The servo circuit 38 receives the RF signal, the tracking error (TE) signal, and the focus error (FE) signal from the amplifier 26. The servo circuit 38 generates various servo signals in response to the RF signal, the TE signal, and the FE signal, and the control signals from the system controller 30. The servo circuit 38 feeds the generated servo signals to the spindle motor 13, the optical pickup 15 (the electromagnetic coils 17 in the optical pickup 15), and the thread motor 21 to implement spindle-motor-speed servo control, tracking servo control, and focus servo control.

The system controller 30 may include a computer system having a combination of an input/output port, a processing unit, and memories. One of the memories may be the memory 33. The computer system, that is, the system controller 30 operates in accordance with a control program (computer program) stored in one of the memories.

The system controller 30 may be divided into subordinate controllers including a first subordinate controller assigned the control of the whole of the optical-disc player 10 and a second subordinate controller assigned the control of the drive of the optical disc 11 (that is, the control of the optical-disc drive). The first subordinate controller and the second subordinate controller are referred to as the whole controller and the drive controller, respectively. The whole controller in the system controller 30 includes a microcomputer having a combination of an input/output port, a processing unit, and memories. One of the memories may be the memory 33. The whole controller operates in accordance with a control program (computer program) stored in one of the memories therein. Similarly, the drive controller in the system controller 30 includes a microcomputer having a combination of an input/output port, a processing unit, and memories. One of the memories may be the memory 33. The drive controller operates in accordance with a control program (computer program) stored in one of the memories therein.

Figure 2:
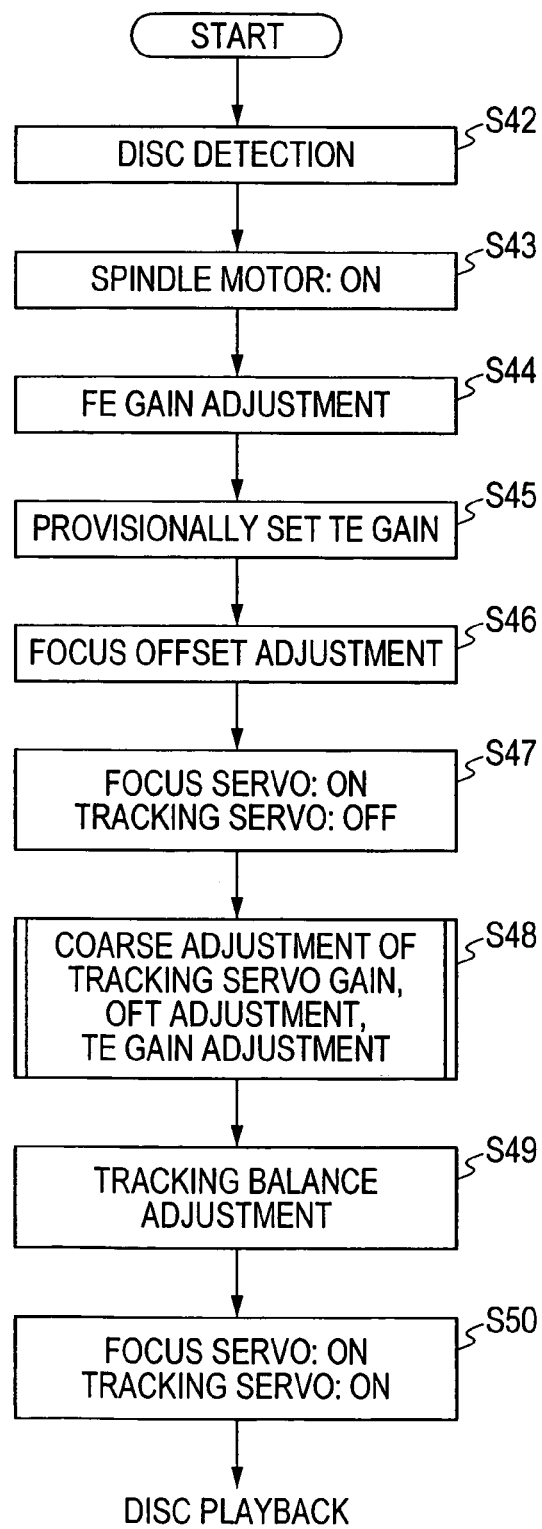
FIG. 2 is a flowchart of a segment (routine) of a control program for a system controller in FIG. 1.

FIG. 2 is a flowchart of a segment (routine) of the control program for the system controller 30 (the whole controller in the system controller 30) which is executed before a playback process. The program segment in FIG. 2 is designed to implement automatic adjustment as preparations for the playback process.

As shown in FIG. 2, a first step S42 of the program segment decides whether or not an optical disc is inserted into the optical-disc player 10 in a known way referring to, for example, an output signal from a disc insertion sensor (not shown). When the first step S42 decides that an optical disc is inserted into the optical-disc player 10, the program advances from the step S42 to a step S43. Otherwise, the step S42 is repeated.

On rare occasions, the user inserts into the optical-disc player 10 an optical disc upside down or an optical disc which can not be driven by the optical-disc player 10. Recorded information can not be reproduced from such an optical disc by the optical-disc player 10.

The step S43 turns on power supply to the spindle motor 13 by controlling the servo circuit 38 via the drive controller. As a result, the spindle motor 13 starts to rotate.

A step S44 following the step S43 controls the servo circuit 38 through the drive controller to adjust the gain for the FE signal to make proper the amplitude of the FE signal.

A step S45 subsequent to the step S44 controls the servo circuit 38 through the drive controller to provisionally set the gain for the TE signal to make proper the amplitude of the TE signal. During the execution of the step S45, a tracking servo (Tr) remains in its off state and is not in its on state yet.

A step S46 following the step S45 controls the optical pickup 15 and the servo circuit 38 through the drive controller to adjust a focus offset. The characteristics of parts vary from player to player so that an FE signal varies from player to player. The focus offset is designed to compensate for such FE signal variations. The step S46 holds a focus servo (Fo) in its off state. Thus, the adjustment of the focus offset is implemented while the focus servo remains in its off state. In the focus servo which will be started after the step S46, the FE signal and the focus offset are added to generate an addition-result signal used as an Fo feedback signal (a focus servo signal).

A step S47 subsequent to the step S46 controls the servo circuit 38 through the drive controller to turn on the focus servo which uses the focus offset adjusted by the step S46. The step S47 holds the tracking servo in its off state.

A block S48 following the step S47 controls the servo circuit 38 through the drive controller to coarsely adjust a tracking servo (Tr) gain. During the coarse adjustment of the tracking servo gain, the block S48 controls the servo circuit 38 through the drive controller to adjust an off-track (OFT) signal and the gain for the tracking error signal. Furthermore, during the coarse adjustment of the tracking servo gain, the block S48 controls the servo circuit 38 through the drive controller to continuously suspend operation of the thread motor 21.

A step S49 subsequent to the block S48 controls the servo circuit 38 through the drive controller to adjust a tracking balance. The adjustment of the tracking balance allows a reference value for the tracking error signal to correspond to the position of the center line in the track width regardless of parts-characteristic variations from optical pickup to optical pickup.

A step S50 following the step S49 controls the servo circuit 38 through the drive controller to turn on the focus servo and the tracking servo. Then, the step S50 controls the servo circuit 38 through the drive controller to turn on a traverse servo for the thread motor 21.

After the step S50, the program advances to a next segment (routine) for the playback of the inserted optical disc.

Figure 3:
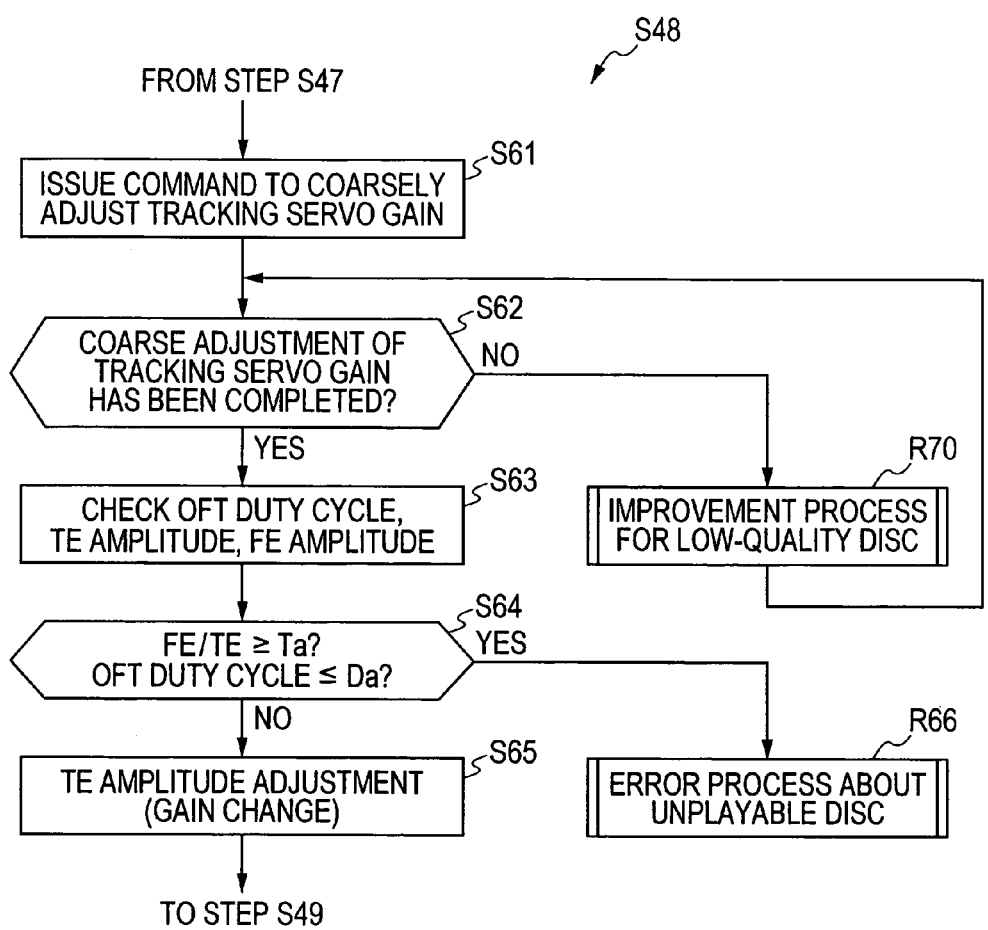
FIG. 3 is a flowchart of the internal structure of a block in FIG. 2.

FIG. 3 shows the internal structure of the block S48. As shown in FIG. 3, the block S48 has a step S61 following the step S47 of FIG. 2. The step S61 issues, to the drive controller, a command to coarsely adjust the tracking servo gain. The drive controller starts the coarse adjustment of the tracking servo gain in response to the issued command. During the coarse adjustment, the drive controller implements the adjustment of the off-track (OFT) signal and the gain adjustment for the TE signal. After the step S61, the program advances to a step S62.

The step S62 decides whether or not the coarse adjustment of the tracking servo gain has been completed. In the drive controller, a prescribed variable is used as an indication of whether or not the coarse adjustment of the tracking servo gain has been completed. In the case where the coarse adjustment has not yet been completed, the drive controller holds the value of the prescribed variable to "H". When the coarse adjustment has been completed, the drive controller changes the value of the prescribed variable from "H" to "L". The step S62 reads out the value of the prescribed variable from the drive controller, and implements the above decision by referring to the read-out value. When the step S62 decides that the coarse adjustment has been completed, the program advances from the step S62 to a step S63. On the other hand, when the step S62 decides that the coarse adjustment has not yet been completed, the program advances from the step S62 to a routine R70 designed to implement a measure or an improvement process for a low-quality optical disc. For example, an excessively-small amplitude of the TE signal causes a delay in the completion of the coarse adjustment.

The step S63 checks the duty cycle of the off-track (OFT) signal, the amplitude of the TE signal, and the amplitude of the FE signal. As previously mentioned, during the coarse adjustment of the tracking servo gain, the OFT signal adjustment and the gain adjustment for the TE signal are implemented also. The drive controller stores a signal indicating the duty cycle of the off-track signal which occurs during the coarse adjustment of the tracking servo gain. In addition, the drive controller stores a signal indicating the amplitude of the TE signal, that is, the peak-to-peak values of the TE signal for a predetermined number of zero crosses which occur during the coarse adjustment of the tracking servo gain. The step S63 reads out these signals from the drive controller, and implements the above checks on the duty cycle of the off-track signal and the amplitude of the TE signal by referring to the values indicated by the read-out signals.

A step S64 following the step S63 decides whether the inserted optical disc is playable or unplayable (drivable or undrivable) by the optical-disc player 10. When the step S64 decides that the inserted optical disc is playable, the program advances from the step S64 to a step S65. On the other hand, when the step S64 decides that the inserted optical disc is unplayable, the program advances from the step S64 to a routine R66 for an error process about an unplayable (undrivable) optical-disc.

Specifically, the step S64 calculates the ratio "FE/TE" of the amplitude of the focus error (FE) signal to that of the tracking error (TE) signal. The step S64 decides whether or not the calculated ratio "FE/TE" is smaller than a predetermined threshold value Ta. When the step S64 decides that the ratio is smaller than the threshold value Ta, the program advances from the step S64 to the step S65. On the other hand, when the step S64 decides that the ratio is equal to or greater than the threshold value Ta, the program advances from the step S64 to the error process routine R66 for an unplayable disc.

Alternatively, the step S64 may decide whether or not the duty cycle of the off-track (OFT) signal is greater than a predetermined threshold value Da. When the step S64 decides that the duty cycle is greater than the threshold value Da, the program advances from the step S64 to the step S65. On the other hand, when the step S64 decides that the duty cycle is equal to or smaller than the threshold value Da, the program advances from the step S64 to the error process routine R66 for an unplayable disc.

The step S64 may implement both the decision using the ratio "FE/TE" and the decision using the OFT signal duty cycle.

Figure 4:
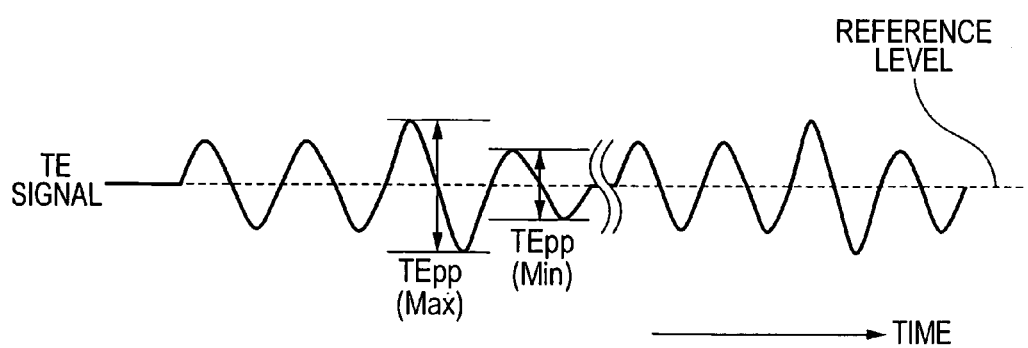
FIG. 4 is a time-domain diagram showing an example of the waveform of a tracking error signal which occurs during coarse adjustment of a tracking gain.

FIG. 4 shows an example of the waveform of the tracking error (TE) signal which occurs during the coarse adjustment of the tracking servo gain. As shown in FIG. 4, the TE signal varies during the coarse adjustment of the tracking servo gain. A zero cross means that the level of the TE signal crosses a reference level corresponding to "zero". For each of a predetermined number of zero crosses during the coarse adjustment of the tracking servo gain, the drive controller measures the peak-to-peak value TEpp of the TE signal and stores a signal indicating the measured peak-to-peak value TEpp. The predetermined number is equal to, for example, 10. The whole controller (the step S63) reads out, from the drive controller, the signals indicating the peak-to-peak values TEpp of the TE signal for the predetermined number of zero crosses. The whole controller (the step S63) selects the greatest TEpp(Max) and the smallest TEpp(Min) from the peak-to-peak values TEpp represented by the read-out signals. The whole controller (the step S63) adds the greatest peak-to-peak value TEpp(Max) and the smallest peak-to-peak value TEpp(Min), and labels the addition result "TEpp(Max)+TEpp(Min)" as a TE signal amplitude used for the amplitude ratio calculation by the step S64. The addition result "TEpp(Max)+TEpp(Min)" corresponds to the average amplitude of the TE signal during the coarse adjustment of the tracking servo gain.

During a given time interval before the implementation of the coarse adjustment of the tracking servo gain, the drive controller measures the peak-to-peak value FEpp of the focus error (FE) signal and stores a signal indicating the measured peak-to-peak value FEpp for each of a predetermined number of zero crosses. The predetermined number is equal to, for example, 10. The step S42 in FIG. 42 may command the drive controller to implement the measurement of the peak-to-peak value FEpp of the FE signal. The whole controller (the step S63) reads out, from the drive controller, the signals indicating the peak-to-peak values FEpp of the FE signal for the predetermined number of zero crosses. The whole controller (the step S63) selects the greatest FEpp(Max) and the smallest FEpp(Min) from the peak-to-peak values FEpp represented by the read-out signals. The whole controller (the step S63) adds the greatest peak-to-peak value FEpp(Max) and the smallest peak-to-peak value FEpp(Min), and labels the addition result "FEpp(Max)+FEpp(Min)" as an FE signal amplitude used for the amplitude ratio calculation by the step S64. The addition result "FEpp(Max)+FEpp(Min)" corresponds to the average amplitude of the FE signal.

The step S65 decides whether or not the improvement process routine R70 for a low-quality optical disc has been executed. Alternatively, the step S65 may check whether or not the inserted optical disc is decided to be a low-quality optical disc by the routine R70. When the routine R70 has been executed or when the inserted optical disc is decided to be a low-quality optical disc, the step S65 controls the servo circuit 38 through the drive controller to change the gain for the FE signal or the gain for the TE signal so that the ratio "FE/TE" will be equal to or greater than 1.6. In addition, the step S65 controls the servo circuit 38 through the drive controller to change the duty cycle of the off-track (OFT) signal to a value equal to or smaller than 50%. The value 1.6 and the value 50% may be replaced by other preset values, respectively. For example, the OFT signal is "H" when the laser beam spot on the inserted optical disc is crossing a track, and is "L" when the laser beam spot is crossing the region between tracks. After the step S65, the program advances to the step S49 in FIG. 2.

Regarding the optical disc inserted into the optical-disc player 10, the ratio "FE/TE" is compared with the threshold value Ta as mentioned above. Alternatively, the duty cycle of the OFT signal may be compared with the threshold value Da. On the basis of the result of the comparison, the whole controller decides whether or not recorded information can be reproduced from the inserted optical disc by the optical-disc player 10. This decision (that is, the disc discrimination) is quicker than a corresponding decision in a prior-art player. In the case where the optical-disc player 10 is a CD player and a DVD (Digital Versatile Disc) is inserted into the CD player, it takes about 7 seconds to complete the disc discrimination. On the other hand, in the prior-art player, it takes about 20 seconds to complete disc discrimination. In the case where the optical-disc player 10 is a CD player and a CD is inserted into the CD player upside down, it takes about 1 to 10 seconds to complete the disc discrimination. On the other hand, in the prior-art player, it takes about 20 seconds to complete disc discrimination.

Figure 5:
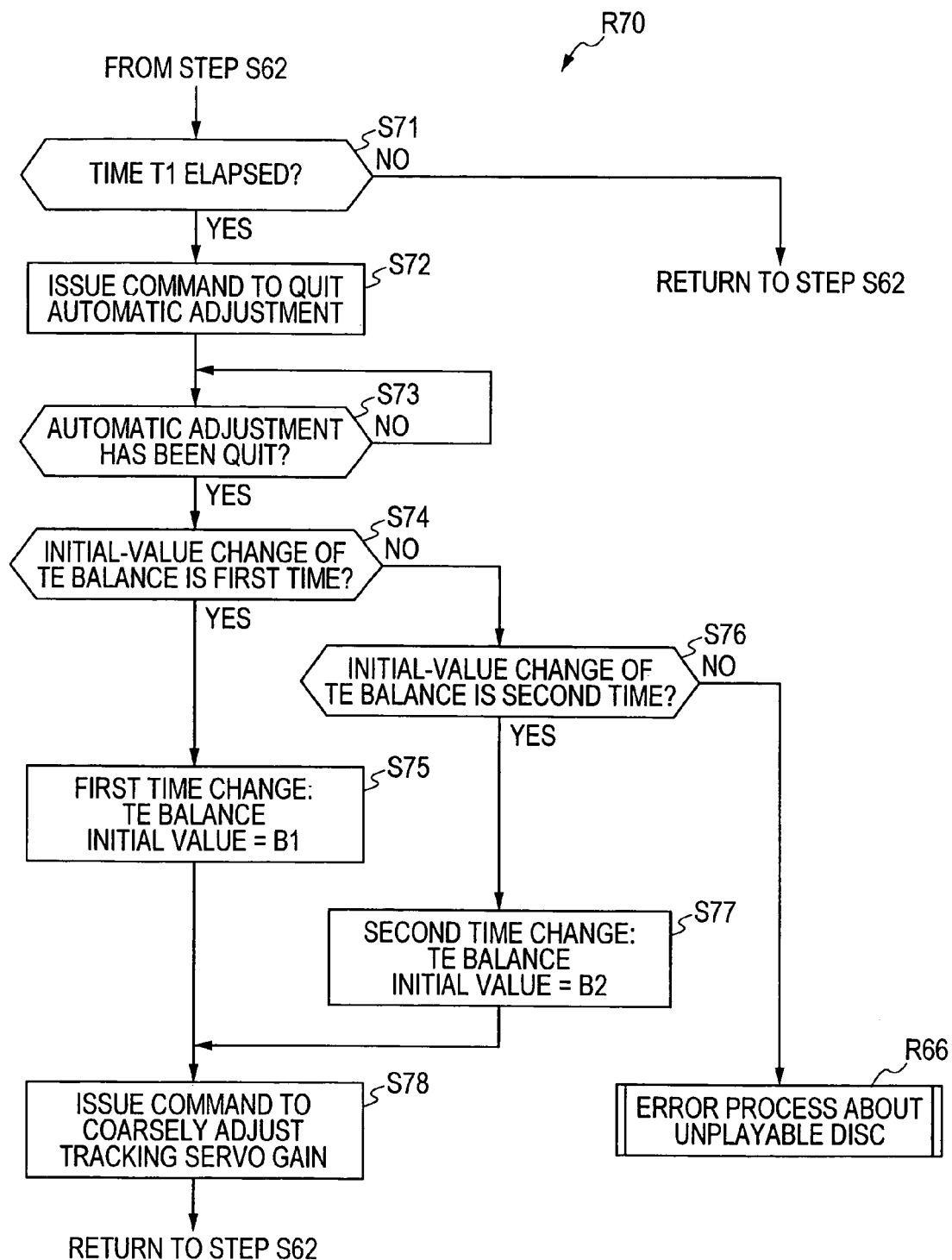
FIG. 5 is a flowchart of the internal structure of a routine in FIG. 3.

FIG. 5 shows the details of the routine R70 for a low-quality optical disc. As shown in FIG. 5, the routine R70 has a step S71 following the step S62 in FIG. 3. The step S71 decides whether or not the lapse of time since the moment of the issue of the latest command to coarsely adjust the tracking servo gain reaches a preset time interval T1 (equal to, for example, 2 seconds). When the step S71 decides that the lapse of time reaches the time interval T1, the program advances from the step S71 to a step S72. When the step S71 decides that the lapse of time does not reach the time interval T1, the program returns from the step S71 to the step S62 in FIG. 3. The step S71 refers to only the latest one of commands for the following reason. A command is issued by not only the step S61 in FIG. 3 but also a step S76 in FIG. 5.

The decision by the step S71 corresponds to a decision about whether or not the inserted optical disc is a low-quality optical disc. When the inserted optical disc is decided to be a low-quality optical disc, the program advances from the step S71 to the step S72.

The step S72 issues, to the drive controller, a command to quit the automatic adjustment as preparations for the playback process (FIG. 2). The drive controller implements quitting the automatic adjustment in response to the issued command. Thus, the drive controller quits the coarse adjustment of the tracking servo gain in response to the issued command. After the step S72, the program advances to a step S73.

The step S73 checks conditions of the drive controller and thereby decides whether or not the automatic adjustment has been quit. When the step S73 decides that the automatic adjustment has been quit, the program advances from the step S73 to a step S74. On the other hand, when the step S73 decides that the automatic adjustment has not yet been quit, the step S73 is repeated.

The step S74 decides whether or not a forthcoming initial-value change of a TE balance is first-time one. When the step S74 decides that the forthcoming initial-value change is first-time one, the program advances from the step S74 to a step S75. On the other hand, when the step S74 decides that the forthcoming initial-value change is not first-time one, the program advances from the step S74 to a step S76.

The step S75 accesses the drive controller to change an initial value of the TE balance from an original value B0 to a preset value B1. The values B0 and B1 are equal to, for example, "00h" and "EAh" respectively. The value B1 provides a shift toward a first side relative to a state provided by the value B0. The B0-to-B1 change of the initial value causes the position, at which the TE signal value is equal to "0", to shift in a first radial direction of the inserted optical disc relative to the position corresponding to the initial value equal to the value B0. After the step S75, the program advances to a step S78.

The step S76 decides whether or not a forthcoming initial-value change of the TE balance is second-time one. When the step S76 decides that the forthcoming initial-value change is second-time one, the program advances from the step S76 to a step S77. On the other hand, when the step S76 decides that the forthcoming initial-value change is not second-time one, the program advances from the step S76 to the error process routine R66.

The step S77 accesses the drive controller to change the initial value of the TE balance to a preset value B2. The value B2 is equal to, for example, "16h". The value B2 provides a shift toward a second side opposite the first side relative to the state provided by the value B0. The change of the initial value to the value B2 causes the position, at which the TE signal value is equal to "0", to shift in a second radial direction opposite the first radial direction of the inserted optical disc relative to the position corresponding to the initial value equal to the value B0. After the step S77, the program advances to the step S78.

The step S78 issues, to the drive controller, a command to coarsely adjust the tracking servo gain as the step S61 in FIG. 3 does. After the step S78, the program returns to the step S62 in FIG. 3.

Figure 6:
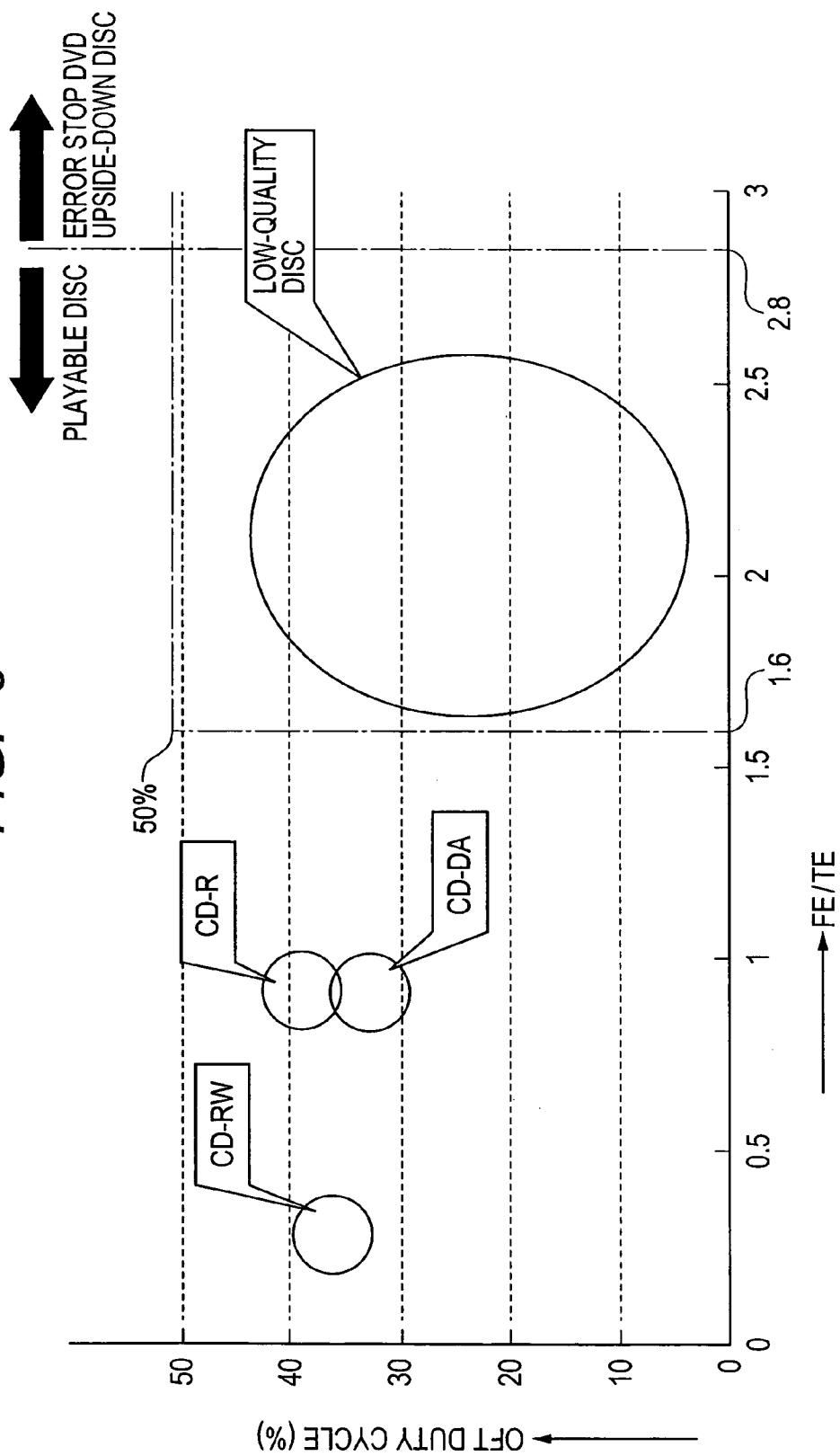
FIG. 6 is a diagram showing relations of optical-disc types with a ratio "FE/TE" and an off-track (OFT) signal duty cycle.

As shown in FIG. 6, there are relations of optical-disc types or CD types with the ratio "FE/TE" and the OFT signal duty cycle. In FIG. 6, the abscissa denotes the ratio "FE/TE" while the ordinate denotes the OFT signal duty cycle. Since characteristics vary from disc to disc, one disc type corresponds to a certain area rather than a point in FIG. 6.

With reference to FIG. 6, regarding CD-RWs, CD-DAs, and standard-quality CD-Rs, the TE signal amplitude is great so that the ratio "FE/TE" is small. In addition, the track width and the track pitch are highly accurate so that areas corresponding to CD-RWs, CD-DAs, and standard-quality CD-Rs are narrow.

On the other hand, regarding low-quality optical discs (for example, low-quality CD-Rs), the TE signal amplitude is small so that the ratio "FE/TE" is great. Regarding most of low-quality optical discs, the OFT signal duty cycle is low. In addition, the track width and the track pitch are low in accuracy so that an area corresponding to low-quality optical discs is broader than those corresponding to CD-RWs, CD-DAs, and standard-quality CD-Rs.

Regarding DVDs, the TE signal amplitude is small so that the ratio "FE/TE" is equal to or greater than 2.8 (FE/TE$\geq$2.8). In the case where the optical-disc player 10 is a CD player and the threshold value Ta used by the step S64 in FIG. 3 is set to 2.8, when a DVD is inserted into the optical-disc player 10, the program in FIG. 3 advances from the step S64 to the error process routine R66 for an unplayable disc. Thus, the DVD in the optical-disc player 10 is decided to be an unplayable disc, and the error process routine R66 is executed.

The error process routine R66 has a step of turning off power supply to the spindle motor 13 by controlling the servo circuit 38 via the drive controller. As a result of turning off power supply, the spindle motor 13 stops. The error process routine R66 further has a step of controlling the drive controller to quit the automatic adjustment as preparations for the playback process (FIG. 2). The error process routine R66 may further has a step of activating a disc ejection mechanism to eject the inserted optical disc from the optical-disc player 10, and a step of controlling the display 32 to indicate that the present optical disc is unplayable (undrivable). After the inserted optical disc is ejected from the optical disc player 10, the program may return from the error process routing R66 to the step S42 in FIG. 2.

In the event that an optical disc is inserted into the optical-disc player 10 upside down, the OFT signal duty cycle is equal to 0% from a theoretical standpoint. Actually, noise causes the OFT signal duty cycle to slightly differ from 0%. In the case where the threshold value Da used by the step S64 in FIG. 3 is set somewhat or appreciably greater than 0%, when an optical disc is inserted into the optical-disc player 10 upside down, the program in FIG. 3 advances from the step S64 to the error process routine R66 for an unplayable disc. Thus, the inserted upside-down optical disc in the optical-disc player 10 is decided to be an unplayable disc, and the error process routine R66 is executed.

Low-quality optical discs correspond to a range in FIG. 6 where the ratio "FE/TE" is equal to or greater than 1.6 and the OFT signal duty cycle is equal to or smaller than 50%. As previously mentioned, in the case where the inserted optical disc is decided to be a low-quality optical disc, the step S65 in FIG. 3 changes the gain for the FE signal or the gain for the TE signal so that the ratio "FE/TE" will be equal to or greater than 1.6. In addition, the step S65 changes the OFT signal duty cycle to a value equal to or smaller than 50%. After the step S65, the program advances to the tracking-balance adjustment step S49 in FIG. 2.

Figure 7:
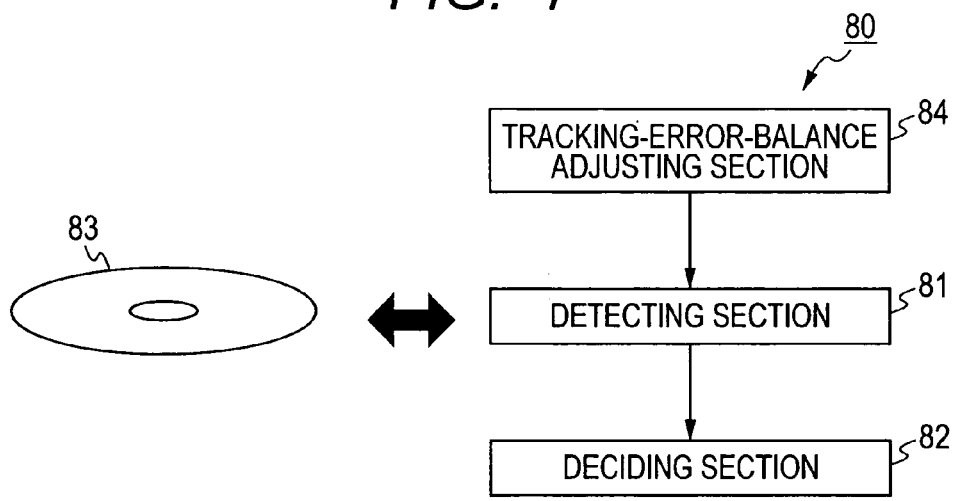
FIG. 7 is a block diagram of a disc discrimination apparatus according to a second embodiment of this invention.

FIG. 7 shows a disc discrimination apparatus 80 according to a second embodiment of this invention. The disc discrimination apparatus 80 may be at least a portion of the optical-disc player 10 in the first embodiment of this invention. The disc discrimination apparatus 80 may be provided in a CD player, a DVD player, a BD (Blu-ray Disc) player, or an optical-disc player able to play optical discs of different types. Preferably, the disc discrimination apparatus 80 is in an optical-disc player designed to be provided in an automotive vehicle. The disc discrimination apparatus 80 may be in a home-use optical-disc player or a portable optical-disc player.

The disc discrimination apparatus 80 includes a detecting section 81 and a deciding section 82. The detecting section 81 detects the ratio in amplitude between the tracking error (TE) signal and the focus error (FE) signal, and the duty cycle of the off-track (OFT) signal with respect to an optical disc 83. The detecting section 81 notifies the detected ratio and the detected OFT signal duty cycle to the deciding section 82. The deciding section 82 decides whether or not the optical disc 83 is playable (drivable) by the present optical-disc player on the basis of at least one of the notified ratio and the notified OFT signal duty cycle. The present optical-disc player means that including the disc discrimination apparatus 80.

The ratio detected by the detecting section 81 is the ratio "FE/TE" of the amplitude of the FE signal to that of the TE signal or the ratio "TE/FE" of the amplitude of the TE signal to that of the FE signal. When the ratio "FE/TE" is smaller than a predetermined threshold value (for example, the threshold value Ta used by the step S64 in FIG. 3) or when the ratio "TE/FE" is greater than a predetermined threshold value (equal to, for example, 1/Ta), the deciding section 82 decides the optical disc 83 to be playable. Otherwise, the deciding section 82 decides the optical disc 83 to be unplayable.

As understood from FIG. 6, in the case where the disc discrimination apparatus 80 is at least a portion of the optical-disc player 10 and the threshold value Ta is set to 1.6, the deciding section 82 (the step S64 in FIG. 3) can discriminate between a low-quality optical disc and any one of a CD-RW, a CD-DA, and a CD-R when deciding whether the optical disc 83 is playable or unplayable. In this case, the optical disc 83 being a low-quality optical disc is decided to be unplayable. On the other hand, the optical disc 83 being one of a CD-RW, a CD-DA, and a CD-R is decided to be playable.

In the case where the disc discrimination apparatus 80 is at least a portion of the optical-disc player 10 and the threshold value Ta is set to 2.8, the deciding section 82 (the step S64 in FIG. 3) can discriminate between an unplayable optical disc and any one of a CD-RW, a CD-DA, a CD-R, and a low-quality optical disc (for example, a low-quality CD-R) when deciding whether the optical disc 83 is playable or unplayable. In this case, the optical disc 83 being one of a CD-RW, a CD-DA, a CD-R, and a low-quality optical disc is decided to be playable. An example of the unplayable optical disc is a DVD.

The deciding section 82 compares the notified OFT signal duty cycle with a predetermined threshold value (for example, the threshold value Da used by the step S64 in FIG. 3), and thereby decides whether the optical disc 83 is playable or unplayable. In the event that an unplayable optical disc is inserted into the present optical-disc player or a playable optical disc is inserted thereinto upside down, the OFT signal duty cycle is approximately equal to 0%. The threshold value Da is set somewhat or appreciably greater than 0% in view of noise interference. When the result of the above comparison indicates that the notified OFT signal duty cycle is equal to or smaller than the threshold value Da, the deciding section 82 decides that the optical disc 83 is unplayable. Accordingly, the optical disc 83 inserted upside down is decided to be unplayable. On the other hand, when the result of the comparison indicates that the notified OFT signal duty cycle is greater than the threshold value Da, the deciding section 82 decides that the optical disc 83 is playable.

Thus, the deciding section 82 detects the type of the optical disc 83 and the upside-down optical disc 83 on the basis of one of the notified ratio and the notified OFT signal duty cycle or both of them. Generally, the detection using both the notified ratio and the notified OFT signal duty cycle is more accurate than that using only one of them.

The TE signal amplitude and the OFT signal duty cycle used by the detecting section 81 are those occurring for a tracking servo gain adjustment term during which the tracking servo gain is adjusted while the focus servo and the tracking servo are in the on state and the off state respectively. After the tracking servo gain adjustment term ends, the deciding section 82 implements the decision as to whether the optical disc 83 is playable or unplayable. Preferably, the FE signal amplitude used by the detecting section 81 is that detected before the tracking servo gain adjustment term or detected during, for example, the decision as to whether or not an optical disc is inserted into the present optical-disc player. The FE signal amplitude used by the detecting section 81 may be that redetected or newly detected during the tracking servo gain adjustment term.

The tracking servo gain adjustment term corresponds to, for example, a term defined by the block S48 in FIG. 2, the steps S61 and S62 in FIG. 3, and the step S71 in FIG. 5. The decision by the deciding section 82 corresponds to, for example, the step S64 in FIG. 3 which follows the step S62.

Preferably, the disc discrimination apparatus 80 further includes a tracking-error-balance adjusting section 84 which decides whether or not the tracking servo gain adjustment has been completed in a given term. In the case where the tracking servo gain adjustment has not been completed in the given term, the tracking-error-balance adjusting section 84 suspends the tracking servo gain adjustment and forcedly terminates the tracking servo gain adjustment term. Then, the tracking-error-balance adjusting section 84 adjusts or changes the tracking error balance to another value (an after-adjustment value), and thereafter restarts the tracking servo gain adjustment and the tracking servo gain adjustment term.

The operation of the tracking-error-balance adjusting section 84 corresponds to, for example, the improvement process routine R70 in FIG. 3. First and second predetermined values respectively in opposite sides of a reference value for the tracking error balance are prepared as the after-adjustment value used by the tracking-error-balance adjusting section 84. The tracking servo gain adjustment is implemented while the first predetermined value is used as the tracking error balance. In the event that the tracking servo gain adjustment has not been completed in the given term, the tracking-error-balance adjusting section 84 suspends the tracking servo gain adjustment and adjusts or changes the tracking error balance to the second predetermined value. Then, the tracking-error-balance adjusting section 84 restarts the tracking servo gain adjustment in which the second predetermined value is used as the tracking error balance. The first and second predetermined values correspond to, for example, the preset values B1 and B2 used by the steps S75 and S77 in FIG. 5.

The detecting section 81, the deciding section 82, and the tracking-error-balance adjusting section 84 may include a computer system having a combination of an input/output port, a processing unit, and memories. The computer system operates in accordance with a control program (computer program) stored in one of the memories.

Figure 8:
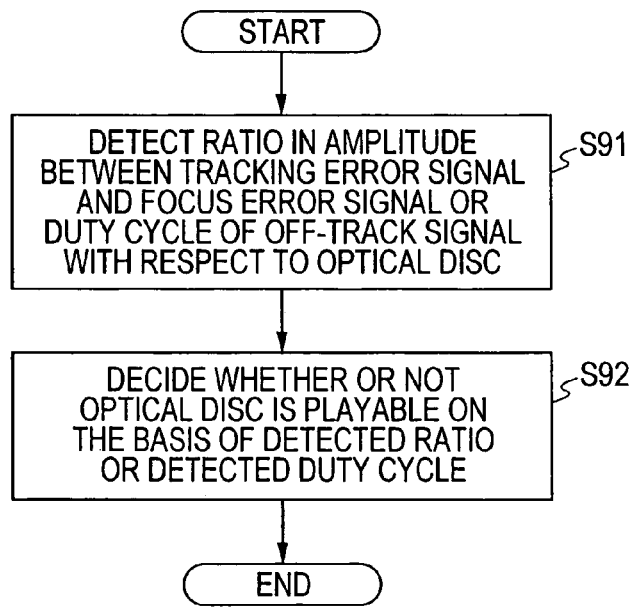
FIG. 8 is a flowchart of a segment (routine) of a control program for a computer system in the disc discrimination apparatus of FIG. 7.

FIG. 8 is a flowchart of a segment (routine) of the control program for the computer system. As shown in FIG. 9, the program segment has a sequence of steps S91 and S92.

The step S91 detects at least one of the ratio in amplitude between the TE signal and the FE signal, and the duty cycle of the OFT signal with respect to an optical disc 83. The step S92 decides whether or not the optical disc 83 is playable (drivable) by the present optical-disc player on the basis of at least one of the detected ratio and the detected OFT signal duty cycle.

The steps S91 and S92 correspond to the detecting section 81 and the deciding section 82, respectively. A step corresponding to the tracking-error-balance adjusting section 84 may be added to the program segment in FIG. 9 at a position preceding the step S91.

What is claimed is:

1. A disc discrimination apparatus comprising:
   a detecting section configured to detect at least one of a ratio between a tracking error and a focus error, and a duty cycle of an off-track signal with respect to an optical disc;
   a deciding section configured to decide whether or not the optical disc is playable on the basis of said at least one of the ratio and the duty cycle detected by the detecting section;
   a focus servo;
   a tracking servo;
   means configured to adjust a tracking servo gain while holding the focus servo in its on state and holding the tracking servo in its off state; and
   wherein the tracking error used for the ratio and the duty cycle are those occurring while the tracking servo gain is adjusted by said means, and the deciding section decides whether or not the optical disc is playable after said adjusting the tracking servo gain has been completed;
   a tracking-error-balance adjusting section configured to decide whether or not said adjusting the tracking servo gain has been completed in a given term, to suspend said adjusting the tracking servo gain in cases where said adjusting the tracking servo gain has not been completed in the given term, to change a tracking error balance when said adjusting the tracking servo gain is suspended, and to restart said adjusting the tracking servo gain after the tracking error balance is changed.

2. A disc discrimination apparatus as recited in claim 1, wherein the ratio is a ratio of the focus error to the tracking error, and the deciding section determines whether or not the ratio is smaller than a predetermined threshold value, and decides that the optical disc is playable when it is determined that the ratio is smaller than the predetermined threshold value.

3. A disc discrimination apparatus as recited in claim 1, wherein the ratio is a ratio of the tracking error to the focus error, and the deciding section determines whether or not the ratio is greater than a predetermined threshold value, and decides that the optical disc is playable when it is determined that the ratio is greater than the predetermined threshold value.

4. A disc discrimination apparatus as recited in claim 1, wherein the tracking-error-balance adjusting section changes the tracking error balance to a first preset value when said adjusting the tracking servo gain is suspended, restarts said adjusting the tracking servo gain after the tracking error balance is changed to the first preset value, decides whether or not said restarted adjusting the tracking servo gain has been completed in the given term, suspends said restarted adjusting the tracking servo gain in cases where said restarted adjusting the tracking servo gain has not been completed in the given term, and changes the tracking error balance to a second preset value when said restarted adjusting the tracking servo gain is suspended, and restarts said adjusting the tracking servo gain after the tracking error balance is changed to the second preset value, and wherein the first and second preset values are in opposite sides of a reference value respectively.

5. A disc discrimination method comprising the steps of:
   detecting at least one of a ratio between a tracking error and a focus error, and a duty cycle of an off-track signal with respect to an optical disc;
   deciding whether or not the optical disc is playable on the basis of said detected at least one of the ratio and the duty cycle;
   adjusting a tracking servo gain while holding a focus servo in its on state and holding a tracking servo in its off state;
   wherein the tracking error used for the ratio and the duty cycle are those occurring while the tracking servo gain is adjusted, and the deciding step comprises deciding whether or not the optical disc is playable after said adjusting the tracking servo gain has been completed;
   deciding whether or not said adjusting the tracking servo gain has been completed in a given term;
   suspending said adjusting the tracking servo gain in cases where said adjusting the tracking servo gain has not been completed in the given term;
   changing a tracking error balance when said adjusting the tracking servo gain is suspended; and
   restarting said adjusting the tracking servo gain after the tracking error balance is changed.

6. A disc discrimination method as recited in claim 5, wherein the ratio is a ratio of the focus error to the tracking error, and the deciding step comprises determining whether or not the ratio is smaller than a predetermined threshold value, and deciding that the optical disc is playable when it is determined that the ratio is smaller than the predetermined threshold value.

7. A disc discrimination method as recited in claim 5, wherein the ratio is a ratio of the tracking error to the focus error, and the deciding step comprises determining whether or not the ratio is greater than a predetermined threshold value, and deciding that the optical disc is playable when it is determined that the ratio is greater than the predetermined threshold value.

8. A disc discrimination method as recited in claim 5, wherein the tracking error balance is changed to a first preset value when said adjusting the tracking servo gain is suspended, and said adjusting the tracking servo gain is restarted after the tracking error balance is changed to the first preset value, and further comprising the steps of deciding whether or not said restarted adjusting the tracking servo gain has been completed in the given term, suspending said restarted adjusting the tracking servo gain in cases where said restarted adjusting the tracking servo gain has not been completed in the given term, changing the tracking error balance to a second preset value when said restarted adjusting the tracking servo gain is suspended, and restarting said adjusting the tracking servo gain after the tracking error balance is changed to the second preset value, and wherein the first and second preset values are in opposite sides of a reference value respectively.

* * * * *